G. D. COOPER.
RUPTURE APPLIANCE.
APPLICATION FILED MAR. 31, 1913.
1,156,979.
Patented Oct. 19, 1915.
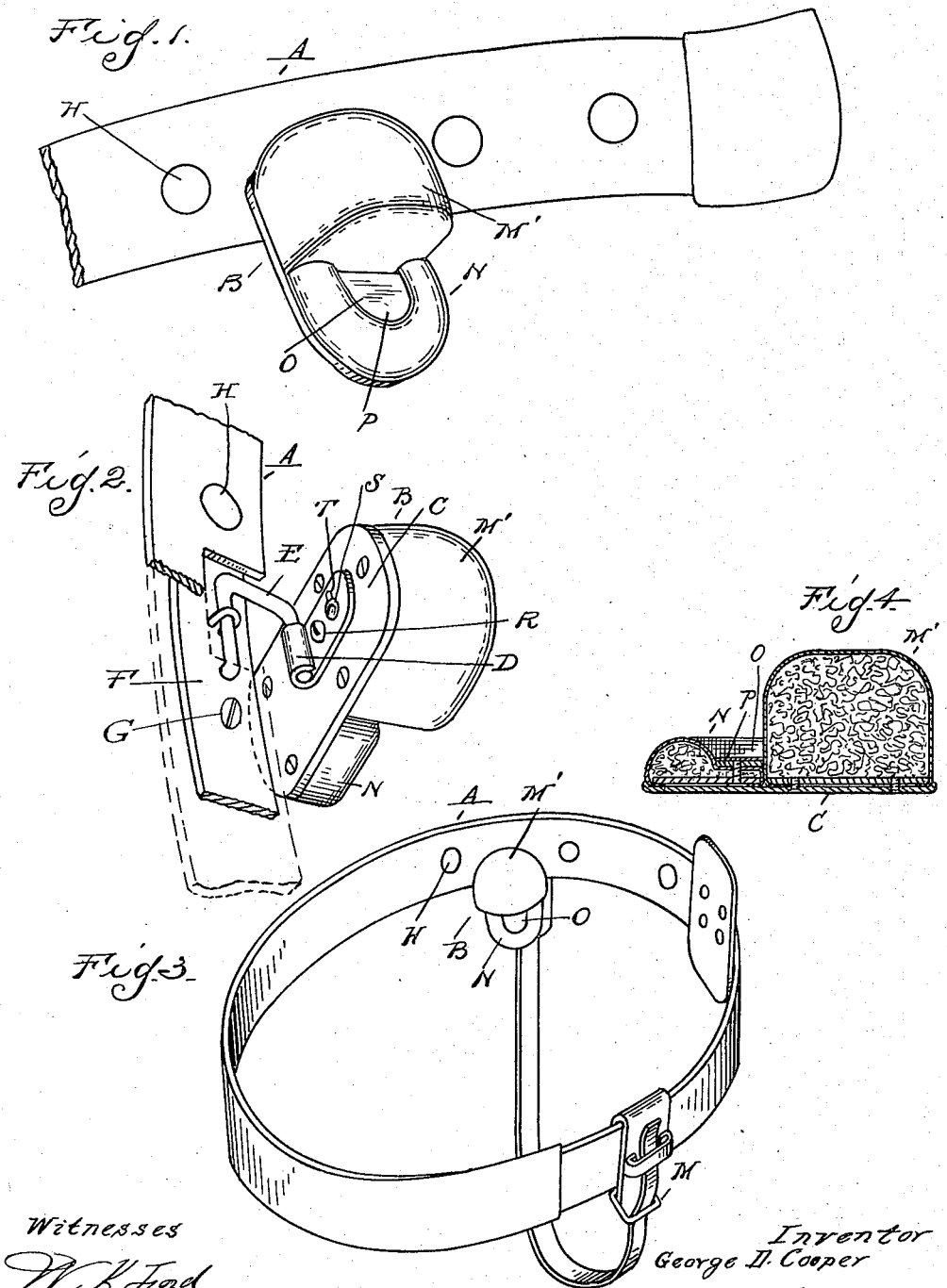
Witnesses
Inventor
George D. Cooper

UNITED STATES PATENT OFFICE.

GEORGE D. COOPER, OF ST. JOHNS, MICHIGAN.

RUPTURE APPLIANCE.

1,156,979.  Specification of Letters Patent.  Patented Oct. 19, 1915.

Application filed March 31, 1913. Serial No. 758,006.

*To all whom it may concern:*

Be it known that I, GEORGE D. COOPER, a citizen of the United States of America, residing at St. Johns, in the county of Clinton and State of Michigan, have invented certain new and useful Improvements in Rupture Appliances, of which the following is a specification, reference being had therein to the accompanying drawings.

The invention relates to rupture appliances, and resides in a construction whereby the pad will be maintained in contact with the body and under the desired pressure in the various positions of the body; in a pad which will conform to a certain extent to the parts engaged thereby, and which is so shaped as to properly engage the parts to be maintained under pressure.

The invention consists in the peculiar construction, arrangement and combination of parts, as will be more fully hereinafter described and claimed.

In the drawings—Figure 1 is a perspective view of a device embodying my invention; Fig. 2 is a fragmentary perspective view illustrating the pad; Fig. 3 is a similar view, showing the connection between the pad and the belt; and Fig. 4 is a section through the pad.

A designates a belt of any suitable construction and B a pad carried by a bracket C that is pivotally mounted at D upon an arm E fixedly secured to a metallic plate F. The plate F may be secured to the belt in any suitable manner, but preferably is arranged upon the outer face thereof and is connected thereto by means of clamping bolts G, the nuts H of which are covered by leather or other suitable material so as to protect the body.

In use, the belt is applied to the body with the pad properly positioned in relation to the part or parts to be maintained under pressure, and the ends of the belt buckled together as at M. With the parts so engaged when the body is bent forward there will be a slight rocking of the belt in relation to the pad, which is permitted because of the pivotal connection therebetween. The belt, however, acts with the pad attached thereto to avoid releasing of the pressure upon the portion of the body engaged by the pad.

For inguinal hernia of certain types, it is desirable to close the inguinal canal and also to close the external abdominal ring. I have therefore devised a novel construction of pad whereby this result may be accomplished. As shown, the pad is formed in two sections, M' N, the upper section M' being considerably thicker than the lower and projecting inwardly beyond the plane of the inner face of the portion N, the bottom or lower side of the upper portion being flat. Each of the sections is filled with a plastic substance, such as a gelatinous material the plasticity of which is adapted to be increased a slight degree by the heat of the body, thereby permitting the pads to conform more or less to the parts under pressure. The section N has the body-engaging portion thereof U-shaped, providing a depression O, and in order to prevent the shape of the section N from being destroyed a reinforcing button P is arranged in the depression.

By the construction of pad before described, when the pad is in position upon the body the upper section closes the external abdominal ring and the lower section closes the inguinal canal. The depression O, however, avoids placing a pressure upon the spermatic cord.

The pivotal connection between the pad and the belt will permit lateral vertical adjustment of these members, and in order to allow of positioning the pad in proper lateral relation to the belt the bracket C is pivoted to the pad at R, and is held in this position of lateral adjustment by means of a clamping screw S that engages an elongated slot T in the bracket.

What I claim as my invention is—

1. A rupture pad composed of two sections, one of said sections projecting inwardly beyond the other and the last-mentioned section provided with a U-shaped body-engaging portion providing a depression, said depression being reinforced by a reinforcing button.

2. A rupture pad composed of two sections, one of said sections projecting inwardly beyond the other, and the other of said sections having a body-engaging portion having a ridge of substantially uniform height throughout.

3. A rupture pad composed of two sections, one of said sections projecting inwardly beyond the other, the other of said sections having a body-engaging portion of substantially uniform height throughout, and being provided with a centrally-located depression.

4. A rupture pad composed of two adjoining sections, one of said sections projecting inwardly a considerable distance beyond the other, said inwardly-projecting section having a comparatively wide flat inner face, and the wall intermediate the sections lying in a plane substantially at right angles to the plane of said inner face.

In testimony whereof I affix my signature in presence of two witnesses.

GEORGE D. COOPER.

Witnesses:
H. E. WALSWORTH,
MARGARET KINMOND.

Copies of this patent may be obtained for five cents each, by addressing the "Commissioner of Patents, Washington, D. C."